May 30, 1939. S. F. WEBB 2,160,243
GROUND WORKING MACHINE
Filed Jan. 3, 1938 4 Sheets-Sheet 1

INVENTOR
SAMUEL F. WEBB
BY
Anderson & Liddy
ATTORNEYS

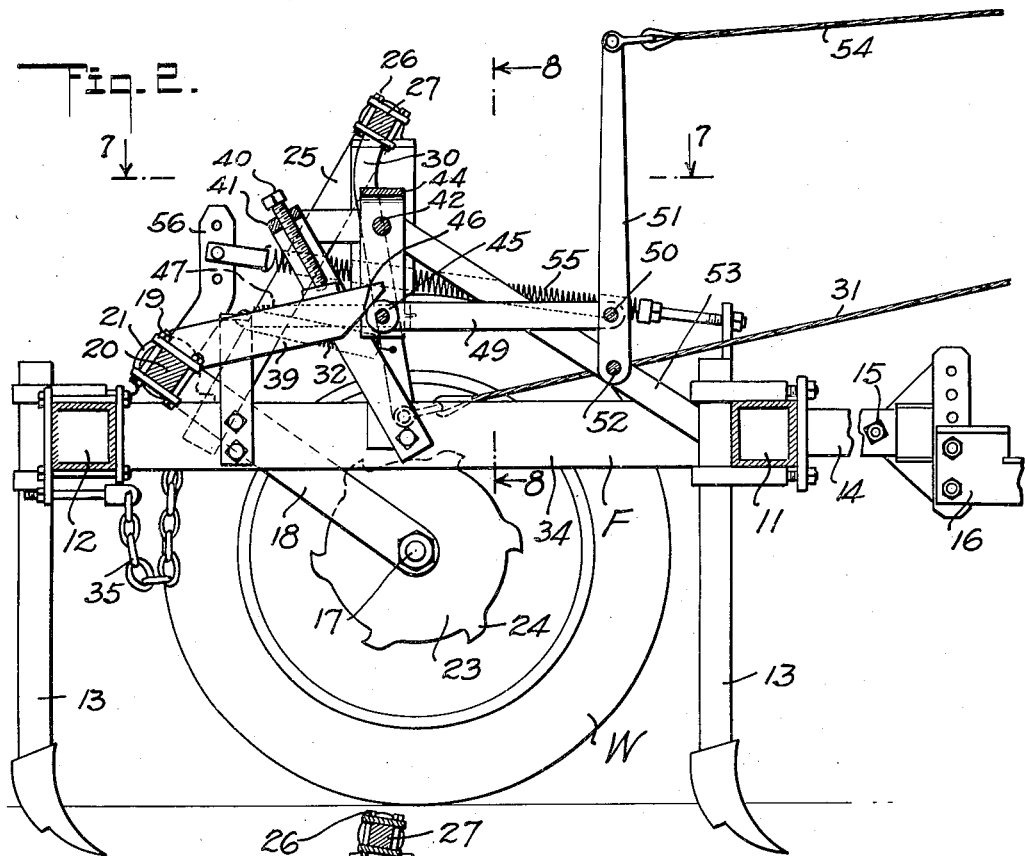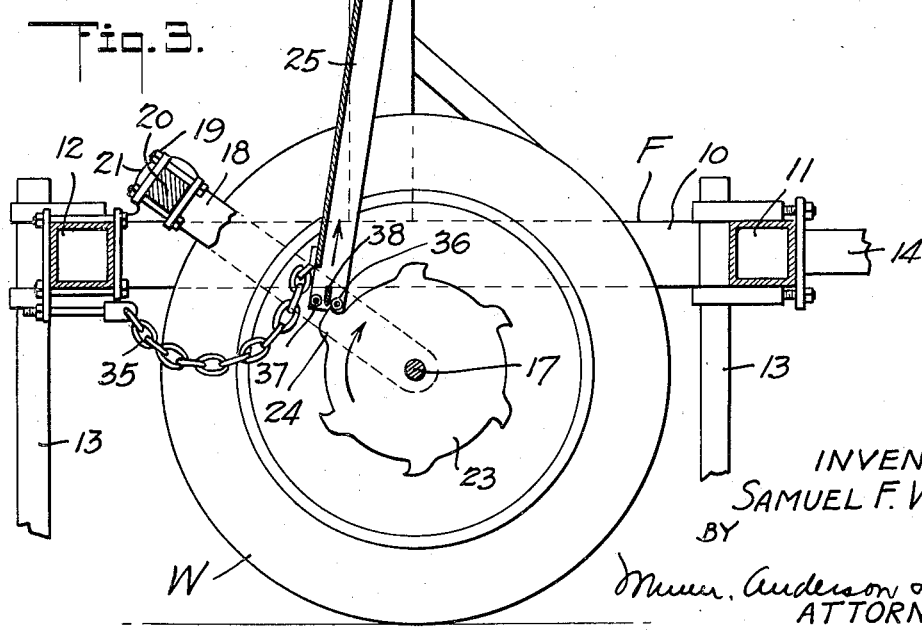

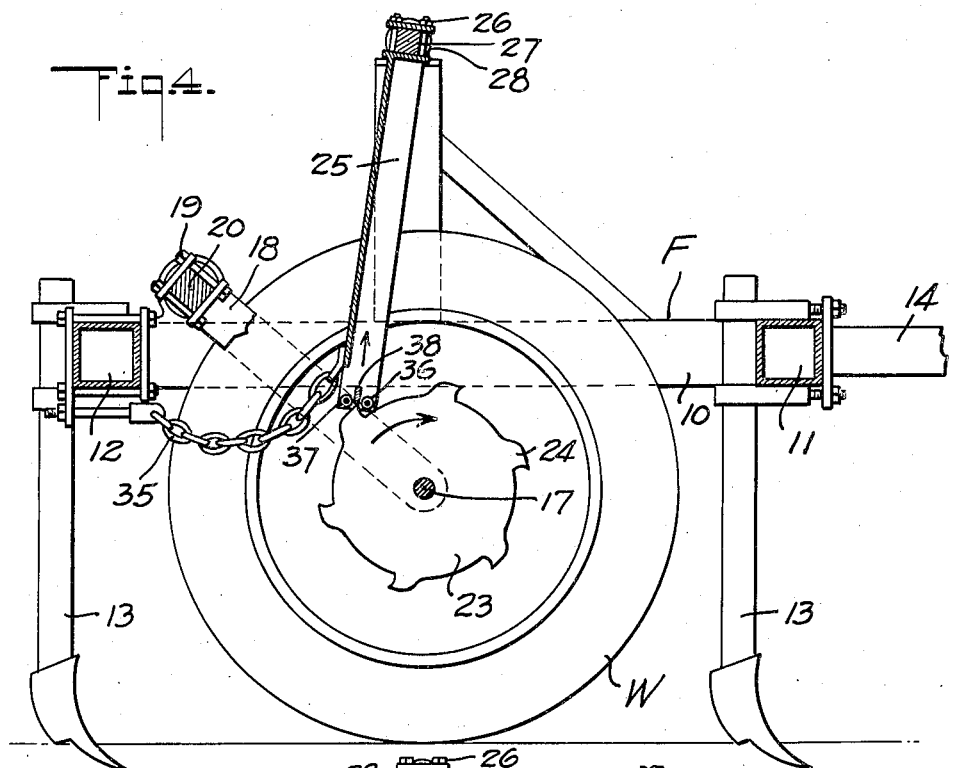
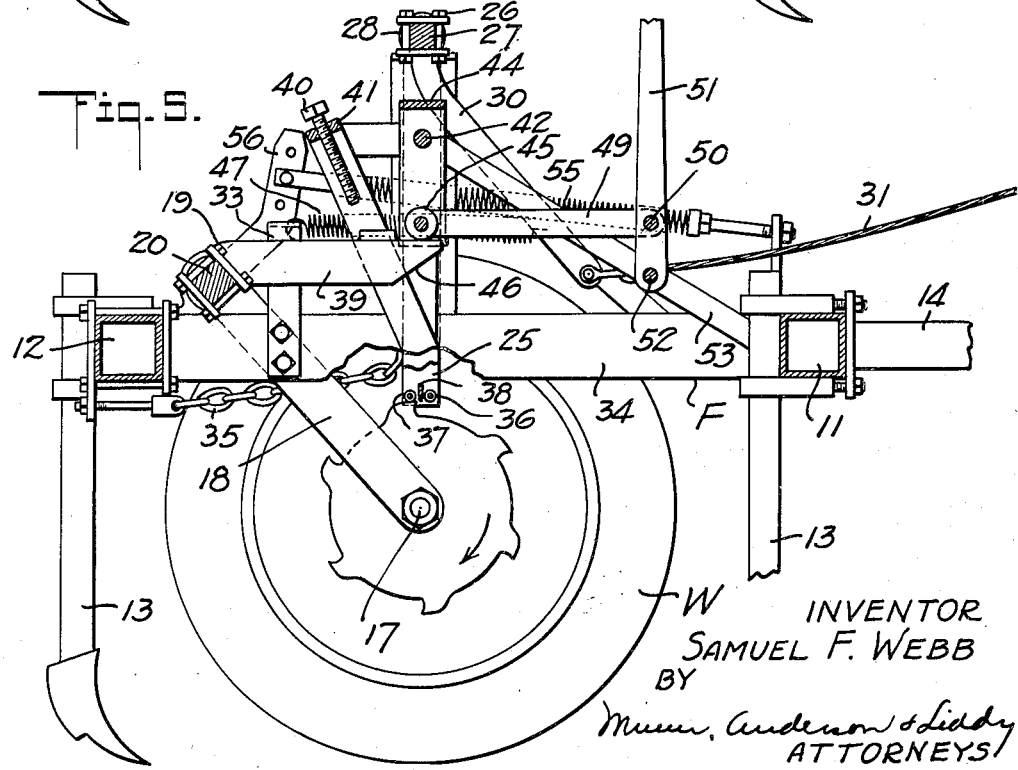

May 30, 1939. S. F. WEBB 2,160,243
GROUND WORKING MACHINE
Filed Jan. 3, 1938 4 Sheets-Sheet 4
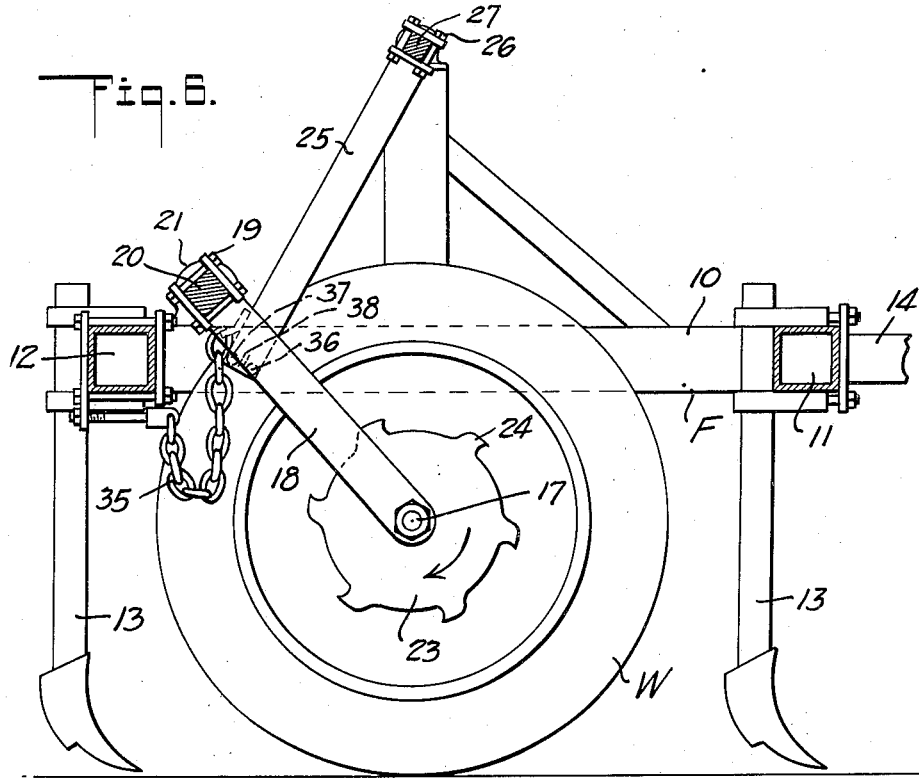
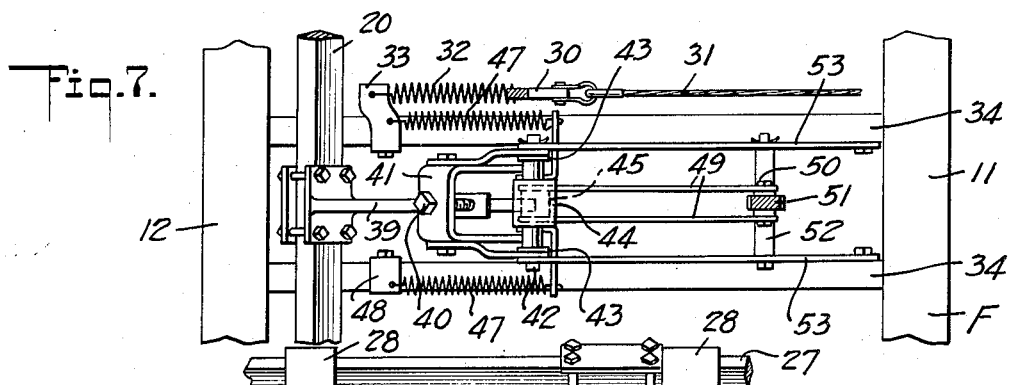
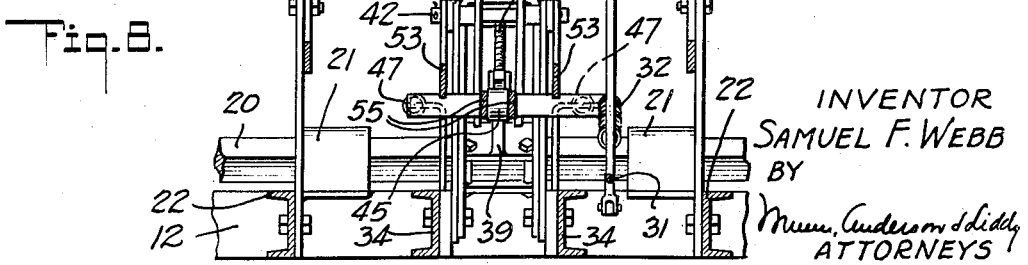
INVENTOR
SAMUEL F. WEBB
BY
ATTORNEYS Patented May 30, 1939

2,160,243

UNITED STATES PATENT OFFICE 2,160,243

GROUND WORKING MACHINE

Samuel F. Webb, Holtville, Calif.

Application January 3, 1938, Serial No. 182,948

3 Claims. (Cl. 97—73)

This invention relates generally to machines of the class embodying various forms of implements operable as the machine traverses the ground, to perform such soil working operations as cultivating, hilling and ditching, or road treating operations such as scarifying or scraping the road surface. In machines of this class a carrier for suporting the implements is usually movably mounted in order to raise the implements clear of the ground or lower the implements into engagement with the ground, according as the machine is to travel idly or to perform its intended operation as the ground is traversed.

An object of this invention is to provide in a machine of the above described character, a mechanism under control of an operator by which the implements of the machine can be automatically raised clear of the ground whenever it is desired to traverse the ground without operating thereupon, or lowered to a working position for the performance of the intended operation of the implements, with the utmost ease and dispatch, whereby to greatly facilitate the handling of the machine as well as materially increasing its efficiency.

A further object of this invention is to provide a mechanism which, in its association with the ground working machine and with a tractor or other draft means for pulling the machine over the ground, utilizes the rolling movement of the supporting, or other ground engaging, wheels of the machine, to move the implements to one position, and wherein the implements are retained for release to the other position by the operator.

With these and other objects in view, the invention consists in the combinations and arrangements of elements as set forth in the following specification and particularly pointed out in the appended claims.

In the accompanying drawings,

Figure 2 is an enlarged vertical sectional view taken on the line 2—2 of Figure 1 and showing the implements of the ground working machine in their lowered or working position;

Figure 3 is an enlarged vertical sectional view taken on the line 3—3 of Figure 1 and illustrating an initial operating position occupied by implement raising mechanism of the machine preparatory to raising the implements to an idle position;

Figure 4 is a view similiar to Figure 3 and illustrating the implements partly raised;

Figure 5 is a view similar to Figure 2 and illustrating the implements releasably retained in fully raised position;

Figure 6 is a view similar to Figure 3 and illustrating the final positions of the working parts of the raising mechanism when the implements are being retained in fully raised position;

Figure 7 is a fragmentary horizontal sectional view taken on the line 7—7 of Figure 2;

Figure 8 is a fragmentary vertical sectional view taken on the line 8—8 of Figure 2.

Figure 1:
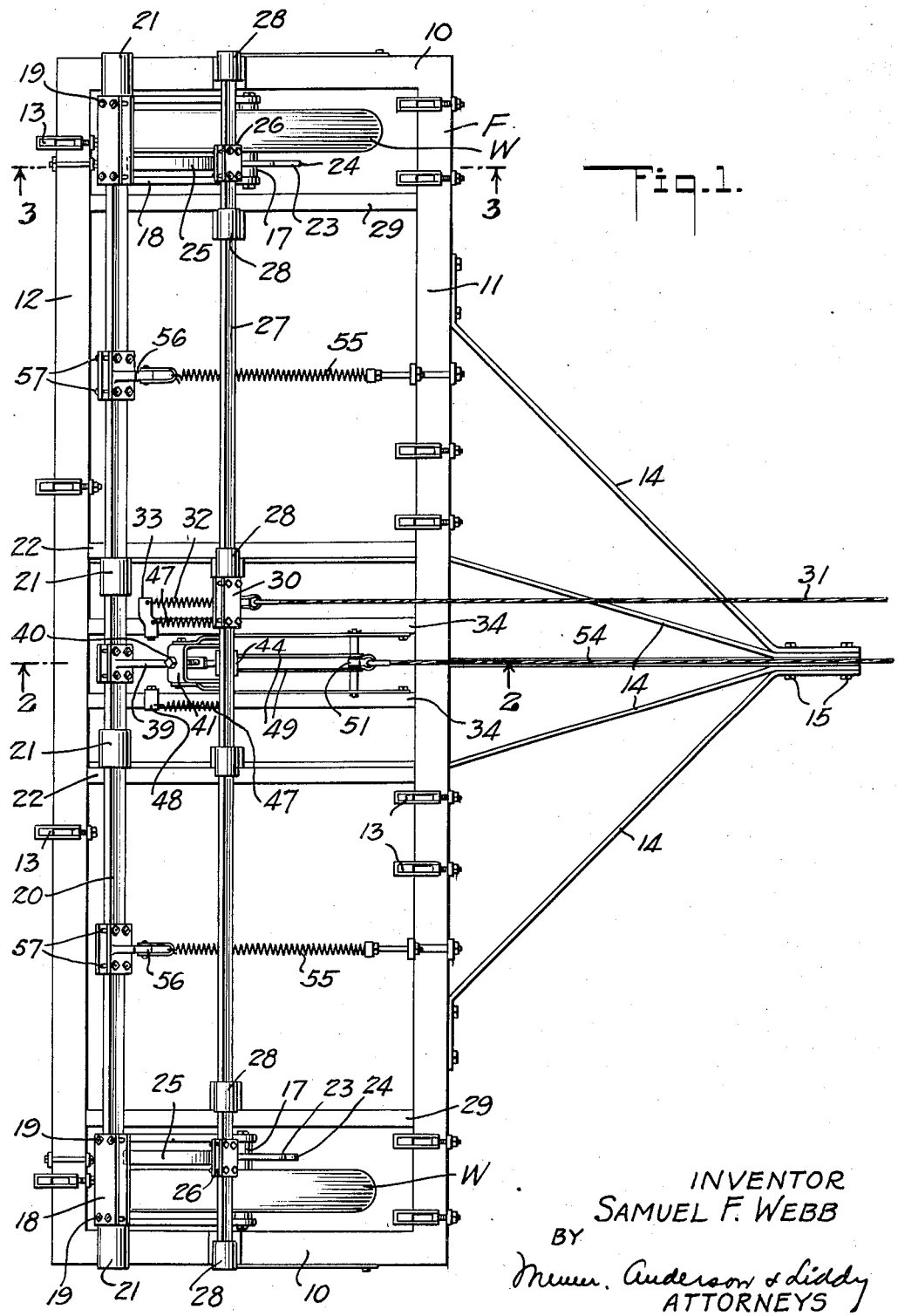
Figure 1 is a plan view of the ground working machine embodying this invention.

Referring specifically to the drawings, the invention in its present embodiment comprises an implement carrier in the form of a rectangular, tubular metal frame F composed of relatively short longitudinal end members 10 and relatively long transverse front and rear members 11 and 12, to either or both of which implements 13 of any suitable character are detachably secured.

The frame F is adapted to be supported for movement over the ground, by wheels W, and is provided with several forwardly converging draw bars 14 secured together at their forward ends by bolts 15 for connection to a detachable coupler 16 (Figure 2) by which the drawbar can be connected to a tractor or other source of power (not shown) for pulling the machine over the ground.

In the present instance, the axles 17 of the wheels W are journaled in yokes 18 secured by bolts 19 to a transverse shaft 20 journaled in bearings 21 fixed to the members 10 of the frame F and to other intermediate frame members 22.

Fixed to the axles 17 within the respective yokes 18 are disks 23 having teeth 24 adapted to co-act with lifting members 25—25 fixed by bolts 26 to a transverse shaft 27 disposed directly above the axis of the wheels W when the frame F is fully raised, and journaled in six bearings 28 fixed to the frame F, the intermediate frame members 22, and other intermediate frame members 29 (Figure 1). Also fixed to the shaft 27 is an actuating lever 30 having a flexible cable or rope connection 31 to an operator on the tractor or other source of power, by which the lifting members 25 can be moved to an active position in opposition to a coil spring 32 fixed at one end to the lever 30, and at its other end to a lug 33 on one of a pair of frame members 34 of the frame F, as most clearly shown in Figures 1, 7 and 8. Chains 35 or other suitable stop means are secured to the rear frame members 12 and to the lifting members 25 to definitely limit the movement of the latter by the teeth 24 of the disks 23 to the perpendicular position shown in Figure 5.

The lifting members 25 are bifurcated at their lower ends and have journaled therein primary and secondary rollers 36—37, respectively, and an intermediate transfer bar 38 which are adapted to co-act with teeth on the disks 23, to raise the frame F in response to forward rolling movement of the wheels W over the ground, all to be fully described hereinafter.

Fixed to the shaft 20 intermediate its ends is a keeper arm 39 adapted to be engaged by an adjustable set screw 40 to definitely limit the lowered position of the frame F as shown in Figures 2 and 3, the set screw being threadedly mounted in a bracket 41 supported by the frame members 34. Pivoted at 42 on posts 43 rising from the frame members 34 is a latching member in the form of a fork 44 in the lower free end of which is journaled a roller 45 with which a cam surface 46 on the arm 39 is adapted to co-act during rising movement of the frame F, to swing the yoke forwardly against the action of springs 47 which are, respectively, connected to the lug 33 and to a lug 48 on the other of the frame members 34 so as to normally urge the yoke to the position shown in Figure 5. As a result of the co-action of the cam surface 46 with the roller 45 during the rising movement of the frame F, the free end of the arm clears the roller which is adapted to ride upon the arm to releasably retain the frame in raised position, as shown in Figure 5.

Connected to the fork 44 at the axis of the roller 45 are links 49 pivotally connected at 50 to an operating lever 51 pivoted at 52 on frame members 53 and having a flexible cable or rope connection 54 at its upper end leading to a point on the tractor accessible to the operator thereon, so that the operator can, by a pull upon the connection 54, clear the roller 45 from the arm 39 so as to permit the frame to lower by gravity against the cushioning action of springs 55 fixed at one end to the front transverse member 11 of the frame F, and at the other end to arms 56 fixed to the shaft 20 by bolts 57.

The operation of the invention is as follows:

Let it be assumed that a tractor is coupled to the frame F by the coupling 16 and that the frame occupies its lowered position shown in Figure 2, so that the implements 13 are in their working position for operation upon the ground.

When it is desired to raise the frame F so that the implements will occupy an idle position clear of the ground, and assuming that the machine is in forward motion over the ground, the operator on the tractor exerts a pull upon the connection 31 to swing the lifting members 25 from the inactive position shown in Figure 2 to the active position shown in Figure 3, wherein the primary rollers 36 on the members 25 are advanced into the paths of rotation of the teeth 24 on the respective disks 23 as the latter are positively driven by the ground wheels W in a clockwise direction as viewed in this figure.

As this rotary movement of the disks 23 continues, a tooth on each disk co-acts with the respective primary roller 36 to push upwardly on the respective lifting member 25 so that through the medium of the shaft 27, rising movement of the frame will be started. It will be noted that the lifting members 25 are being swung forwardly by the co-acting teeth and primary rollers and that as a result of the rising movement thus imparted to the frame F, the arm 39 is swung downwardly relative thereto about the axis of the shaft, with the wheel carrying yokes 18—18 as a unit.

The came surface 46 on the arm 39 is now coacting with the roller 45 to swing the fork 44 about the axis 42 against the action of the springs 47. When the frame F has been raised from the position shown in Figure 3 to that shown in Figure 4, the transfer bars 38 on the lifting members 25 will co-act with the peripheral portion of the respective teeth 24 at the leading edge thereof, to gradually shift the primary rollers out of engagement with the teeth as the clockwise rotation of the disks 23 continues, until upon reaching the fully raised position of the frame F shown in Figure 5, the primary rollers 36 will be entirely out of the path of rotation of the teeth, and the secondary rollers 37 will be riding on the peripheral surface of those teeth with which the primary rollers were previously co-acting, all as clearly shown in Figure 5.

The frame F will now have been fully raised to clear the implements 13 from the ground, with the lifting members occupying perpendicular positions to which they are definitely limited by the chains 35. Concurrently with the final rising movement of the frame, the arm 39 has been swung downwardly through a sufficient angle to clear the roller 45, and thus permit the springs 47 to restore the fork 44 to its original position but with the roller 45 riding upon the arm 39 and thereby functioning as a movable stop or latch co-acting with the arm to releasably retain the frame F in its fully raised position, as is clearly shown in Figure 5. As rotation of the disks 23 continues, the tooth 24 on each thereof with which the respective secondary roller 37 was coacting will have been advanced clear of the latter so as to render the spring 32 free to restore the lifting members 25 to their original inactive position shown in Figure 6, with the frame F retained by the arm 39 and roller 45 in its fully raised position.

When it is desired to lower the frame F, a pull is exerted upon the connection 54 to swing the yoke 44 forwardly a sufficient amount for the roller 45 to clear the free end of the arm 39 and thus release the frame F so that it will gravitate to its lowered position as predetermined by the adjustment of the set screw 40, the lowering movement being retarded and cushioned by the springs 55 so as to prevent damage to the mechanism. The cycle of operation is now complete, from which it will be manifest that under the control of the operator, the implements 13 can be raised clear of the ground in response to movement of the machine over the ground, and as readily released to operate upon the ground, thus greatly facilitating handling of the machine and promoting its efficient use.

What is claimed is:

1. A machine of the class described comprising an implement carrier; ground wheels; a rock shaft journaled on said carrier; means pivotally mounting said wheels from said shaft for raising and lowering movements of the carrier relative to the wheels; lifting members pivotally mounted on the carrier; toothed members rotatable with the ground wheels about their axes; a plurality of means on the lifting members successively co-actable with the teeth of said toothed members when brought into engagement therewith during rotation of the ground wheels, to move the carrier to its raised position; manually operable means for actuating the lifting members; means co-acting with the carrier and said mounting means to latch the carrier in its raised position; and manually operable means for unlatching the carrier to permit movement thereof to its lowered position.

2. A machine of the class described comprising an implement carrier; ground wheels; a rock shaft journaled on said carrier; means pivotally mounting said wheels from said shaft for rising and lowering movements of the carrier relative to the wheels; lifting members pivotally mounted on the carrier; toothed members rotatable with the ground wheels about their axes; primary and secondary rollers and a transfer bar on the lifting members, co-actable with the teeth of said toothed members when brought into engagement therewith during rotation of the ground wheels, to move the carrier to its raised position; manually operable means for actuating the lifting members; means for releasably retaining the carrier in raised position; and manually operable means for actuating the last means to release the carrier for movement to lowered position.

3. A machine of the class described comprising an implement carrier; ground wheels; a rock shaft journaled on said carrier; means pivotally mounting said wheels from said shaft for rising and lowering movements of the carrier relative to the wheels; a second rock shaft journaled on the carrier; lifting arms fixed to the second rock shaft; means urging said arms to an inactive position; means including a plurality of rollers on said arms and means rotatable with the ground wheels, and with which said rollers are successively co-actable to move the carrier to raised position in response to forward rotation of the ground wheels; manually operable means for moving said arms to active position; means co-acting with the carrier and wheel mounting means to releasably retain the carrier in raised position; and manually operable means for releasing the last means to restore the carrier to lowered position.

SAMUEL F. WEBB.